United States Patent [19]
Scheerer

[11] 3,885,930
[45] May 27, 1975

[54] APPARATUS FOR REMOVING AIR-IN-EXCESS-OF-SATURATION FROM WATER SAMPLES TO BE MEASURED

[76] Inventor: Carl C. Scheerer, 1442 Heather Ln., West Chester, Pa. 19380

[22] Filed: Apr. 30, 1974

[21] Appl. No.: 465,534

[52] U.S. Cl. .................. 55/196; 55/208; 55/270; 73/61 R
[51] Int. Cl. ............................................. B01d 19/00
[58] Field of Search............ 73/421 R, 422, 200, 61; 55/52, 53, 54, 159, 196, 198, 270, 39

[56] References Cited
UNITED STATES PATENTS

| | | | |
|---|---|---|---|
| 1,069,169 | 8/1913 | Parker | 209/168 |
| 1,646,019 | 10/1927 | Forrester | 210/44 X |
| 2,718,275 | 9/1955 | Banks | 55/53 X |
| 3,044,236 | 7/1962 | Bearden et al. | 55/270 X |
| 3,096,166 | 7/1963 | Kolthof et al. | 55/198 |
| 3,347,096 | 10/1962 | Person | 73/200 |

FOREIGN PATENTS OR APPLICATIONS 1,201,365   9/1965   Germany ............................. 55/39

*Primary Examiner*—Richard C. Queisser
*Assistant Examiner*—John P. Beauchamp
*Attorney, Agent, or Firm*—Paul & Paul

[57]         ABSTRACT

A method and apparatus is disclosed for removing air-in-excess-of-saturation from water samples to be measured qualitatively. Pressurized air is bubbled throughout the water sample, thereby sweeping air-in-excess-of-saturation from the water sample into the bubbling pressurized air. The air bubbles are then withdrawn from the sample, leaving a water sample substantially free of air-in-excess-of-saturation.

6 Claims, 1 Drawing Figure

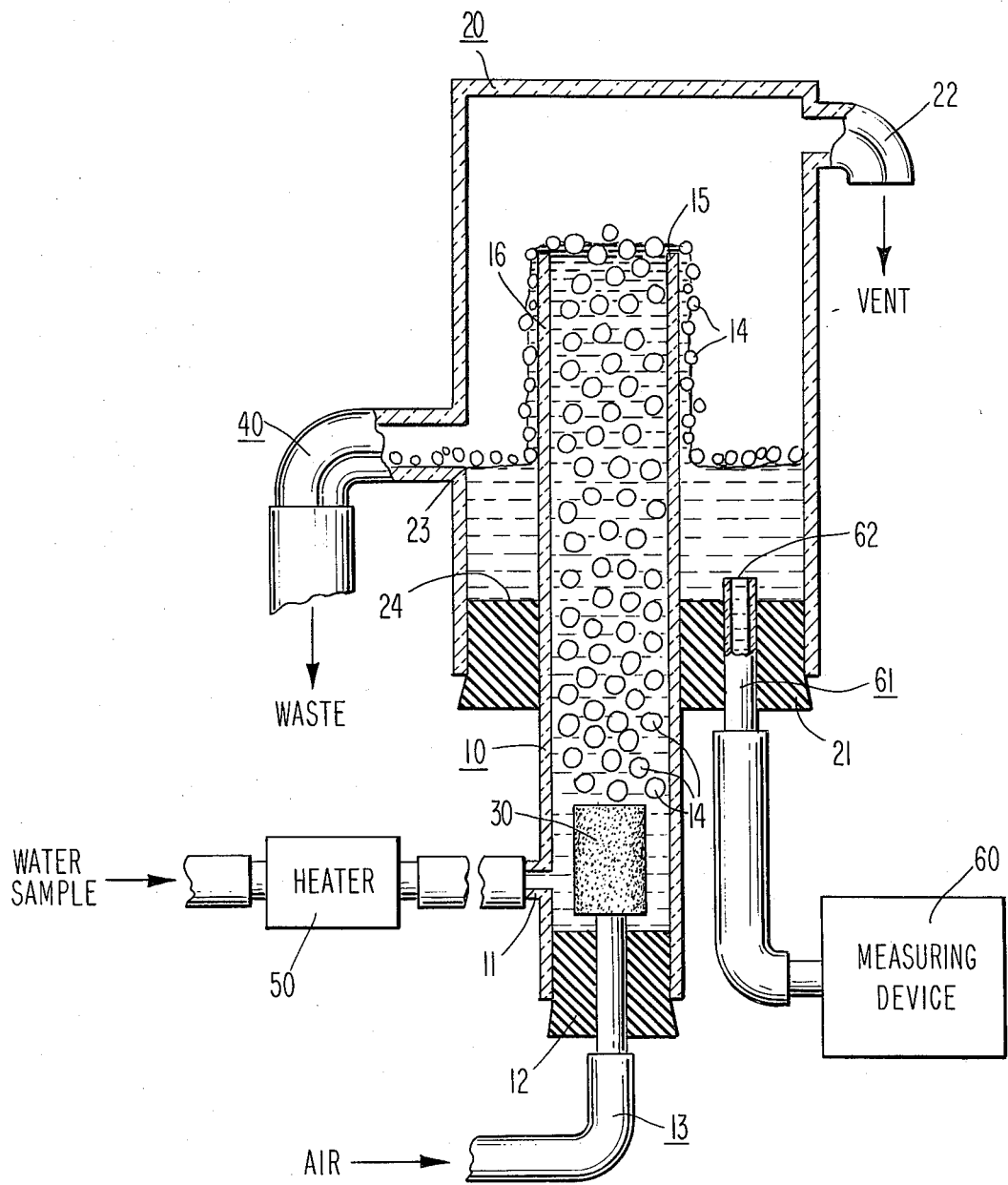

APPARATUS FOR REMOVING AIR-IN-EXCESS-OF-SATURATION FROM WATER SAMPLES TO BE MEASURED

BACKGROUND OF THE INVENTION

This invention relates to an improvement resulting in the avoidance of incorrect measurement instrumentation readings from air bubbles within continuously sampled water samples, and more particularly to a method and apparatus for removing air-in-excess-of-saturation from water samples to be measured.

Modern water treating practice relies on continuous determinations of specific chemical constituents made on a continuously flowing sample of the water being treated. Such control sampling determinations on water samples are made by means of suitable instrumentation for turbidity, pH, conductivity, and other characteristics of clarifiers, drinking water plants, sewage plants, waste treatment, neutralization processes, and the like. For example, in monitoring the demineralization and softening treatment of municipal water supplies, continuous determinations are made for silica and hardness using an instrument commercially available such as the Hach Model 651b colorimeter analyzer.

In these determinations with such instruments, an annoying difficulty occurs when air-saturated incoming water is colder than the instrument sample cell whose temperature may be of the order of 5°F above room temperature. As the incoming water sample warms into temperature equilibrium with the sample cell environment, the sample becomes supersaturated with air and air bubbles are emitted which may momentarily block or interfere with the colorimeter light path and cause false indications and spikes on the recorder charts. Such indications may set off alarms or otherwise interfere with efficient operation of the treatment process.

SUMMARY OF THE INVENTION

Accordingly, it is among the objects of this invention to provide a practicable method and apparatus for removing all air-in-excess-of-saturation from water samples to be measured, thereby eliminating false instrumentation indications caused by air bubbles This and other objects of the invention are obtained with a method and apparatus which consists essentially of passing the stream of water sample through a suitable in-line heater and then up a columnar chamber air-sweep container which overflows into a receiving separation container. Disposed in the bottom of the air-sweep container is a conventional porous aquarium-type air-release stone through which air is supplied under pressure to cause violent bubbling of the water in the air-sweep container. This bubbling action agitates the sample stream and sweeps it free of air-in-excess-of-saturation which mingles with the introduced air bubbles and overflows the open top of the air-sweep container with the sample water. The separation container receiving the sample stream overflowing from the air-sweep container is provided, at a suitable height from its bottom, with an overflow withdrawal means drain that spills a portion of the sample flow and also acts as a head regulator. The air bubbles flow on the surface and are carried away with the spill into the overflow withdrawal means, leaving the water sample in the separation container below the drain level saturated with air and free of bubbles. A bottom connection provides a supply of bubble-free sample water to the measuring instrument, such as a colorimeter for measuring water clarity, whose readings formerly were interfered with by the air bubbles. False indications of the colorimeter due to supersaturation of the water sample, producing air bubbles, is thereby eliminated.

BRIEF DESCRIPTION OF THE DRAWING

The FIGURE illustrates a partial cross-section of the apparatus of the present invention in operation utilizing the method of the present invention.

DESCRIPTION OF THE PREFERRED EMBODIMENT

Referring to the FIGURE, the apparatus of the present invention utilizing the method of the present invention is shown. Air-sweep container 10 protrudes into, and is surrounded by, separation container 20, both being made of glass. Air-release stone 30 is positioned within air-sweep container 10 at the bottom thereof. Separation container 20 is provided with overflow withdrawal means 40.

In operation, the continuously flowing water sample enters in-line heater 50 which heats the water to the temperature at which measurements are eventually taken by measuring device 60. The heated water sample then enters air-sweep container 10 through inlet 11. Air-sweep container 10 is sealed at its lower end with rubber stopper 12, through which protrudes air delivery means 13 which terminates in air release stone 30. Pressurized air travels through air delivery means 13 into air release stone 30 from which it is released in a multitude of small bubbles into the water sample within air-sweep container 10. The air is pressurized so as to cause a violent bubbling throughout the water sample, thereby sweeping air-in-excess-of-saturation from the water sample into the bubbles 14 of pressurized air which preferably are in a state of violent bubbling.

Air-sweep container 10 protrudes through rubber stopper 21 which seals the bottom end of separation container 20. Air-sweep container 10 protrudes into separation container 20 to a point above overflow withdrawal means 40. The continuously flowing water sample together with the multitude of bubbles 14 travels upward air-sweep container 10 to its uppermost end within separation container 20 where the combined water sample, pressurized air, air-in-excess-of-saturation, overflows the top end 15 of air-sweep container 10 and spills down the sides 16 of air-sweep container 10 into separation container 20. The upper portion of separation container 20 contains venting means 22 which vents the interior of separation container 20 to atmosphere.

The water sample and bubbles are thus transferred into the separation container 20 wherein the air bubbles can become floatably separated from the water sample itself. Overflow withdrawal means 40 serves as a drain for the air bubbles which float upon the surface of the water sample within separation container 20 and also for that part of the water sample which would rise to a point above the point 23 on the side of separation container 20 at which overflow withdrawal means 40 is attached. Thus a constant head of water sample is maintained between point 23 and point 24 which is the uppermost portion of rubber stopper 21. This maintenance of a constant head provides a constant pressure for use in calibrating measuring device 60. Withdrawal of the floatably separated bubbles from the water sample in separation container 20 is thus accomplished by overflow withdrawal means 40 which transports them to a waste disposal.

Air release stone 30 is of a type commercially available for use in aquariums of the type used in homes, or the like. In operation, air bubbles emanate violently from air release stone 30 and sweep upwards through the entirety of the water sample present within air-sweep container 10.

The portion of the water sample within separation container 20 immediately above surface 24 of rubber stopper 21 and below point 23 where the air bubbles 14 are withdrawn by overflow withdrawal means 40, is thus essentially free of air-in-excess-of-saturation and is of a quality that will not result in incorrect instrumentation measurement readings of the quality of the water because of air bubbles within the water sample. Accordingly, measuring device sample tube 61 protrudes through rubber stopper 21 into separation container 20 to a point slightly above surface 24, rubber stopper 21. The water sample is then withdrawn from separation container 20 into measuring device sample tube 61 through its terminal surface 62 within separation container 20 and transported to the measuring device 60 connected thereto.

It will be apparent from the foregoing that various other modifications may be made in the details of construction, use, and operation of the invention, and yet still be within the spirit and scope of the present invention as defined in the following claims.

What is claimed is:

1. Apparatus adapted for use in removing air-in-excess-of-saturation from a water sample to be measured, comprising:

an air-sweep container, having an inlet through which the water sample to be measured enters, and having an outlet through which the water sample to be measured exits;

an air-release stone, positioned within said air-sweep container such that air bubbles emanating from said air-release stone sweep through the entirety of a water sample present within said air-sweep container;

a separation container, positioned so as to receive combined water sample, air bubble effluent from the outlet of said air-sweep container, adapted to permit the floatable separation of the air bubbles from the water sample; and overflow withdrawal means, attached to said separation container, through which the separated air bubbles are withdrawn from said separation container, thereby resulting in a water sample within said separation container free of air-in-excess-of-saturation.

2. Apparatus according to claim 1, wherein said water sample is a continuously flowing water sample.

3. Apparatus according to claim 2, further including heating means to heat the water sample to the temperature at which measurements are to be taken, before the water sample enters said air-sweep container.

4. Apparatus according to claim 3, wherein said overflow withdrawal means is adapted to additionally provide a constant head of water sample within said separation container.

5. Apparatus according to claim 4, wherein said separation container is vented to atmosphere.

6. In combination with a measuring device for continuously measuring the quality of a continuously flowing water sample, the improvement resulting in the avoidance of incorrect measurement instrumentation readings from air bubbles within the water sample, comprising an apparatus according to claim 5.

* * * * *